United States Patent [19]
Nourbakhsh

[11] Patent Number: 5,345,376
[45] Date of Patent: Sep. 6, 1994

[54] SWITCHING POWER SUPPLY WITH ELECTRONIC ISOLATION

[75] Inventor: Farhad Nourbakhsh, Watertown, S. Dak.

[73] Assignee: Tescom Corporation, Elk River, Minn.

[21] Appl. No.: 20,289

[22] Filed: Feb. 19, 1993

[51] Int. Cl.⁵ .......................................... H02M 3/07
[52] U.S. Cl. ........................................ 363/62; 363/89; 323/351
[58] Field of Search ................. 363/89, 62; 323/349, 323/351; H02M 3/07

[56] References Cited

U.S. PATENT DOCUMENTS

| | | | |
|---|---|---|---|
| 3,478,258 | 11/1969 | Nagai | 363/62 |
| 3,505,586 | 4/1970 | Dulin | 363/62 |
| 3,513,376 | 5/1970 | Hajek | 363/62 |
| 3,581,187 | 5/1971 | Grady | 363/89 |
| 3,602,795 | 8/1971 | Gunn | 363/62 |
| 3,808,512 | 4/1974 | Sakka | 363/62 |
| 3,863,135 | 1/1975 | Atwood et al. | 363/62 |
| 3,879,648 | 4/1975 | Hoffman, Jr. | 363/62 |
| 4,205,369 | 5/1980 | Asano | 363/62 |
| 4,408,268 | 10/1983 | Peters et al. | 363/62 |
| 4,841,427 | 6/1989 | Miyazaki et al. | 363/62 |
| 4,994,954 | 2/1991 | Katz et al. | 323/351 X |
| 5,148,358 | 9/1992 | Estes, Jr. | 323/351 X |

FOREIGN PATENT DOCUMENTS 2-146955  6/1990  Japan ..................... H02M 3/07

Primary Examiner—Kristine L. Peckman
Assistant Examiner—Y. Jessica Han
Attorney, Agent, or Firm—Palmatier, Sjoquist & Helget

[57] ABSTRACT

A switching power supply that converts an input AC or DC voltage to a regulated output DC voltage while offering electrical isolation between the input and output stages through use of solid state switches and charge storage devices in place of isolation transformer used in traditional systems. The power supply uses two series connected switching blocks that alternately charge and discharge a storage capacitor, wherein each switching block includes a pair of switches which may be turned on and off with a duty cycle adjusted by a controller. The duty cycle and on time of each block is adjusted such that respective blocks are never turned on at the same time, thereby providing electrical isolation.

12 Claims, 2 Drawing Sheets

SWITCHING POWER SUPPLY WITH ELECTRONIC ISOLATION

BACKGROUND OF THE INVENTION

This invention relates to a switching power supply for converting an alternating current line voltage to a variable and regulated direct current output voltage. The invention finds particular application in providing a direct current (DC) power supply from an alternating current (AC) source, wherein voltage isolation is desired between the AC source and the DC power.

Typical prior art power supplies utilize transformer coupling in one form or another. The use of the transformer provides the ability to convert an input signal from a first input AC voltage to a second, usually lower, output AC voltage, and also provides a means for obtaining electrical isolation between the output and input lines. Among the disadvantages in utilizing a transformer in such circuits is that the transformer typically dissipates about 20%–50% of the power applied to it, and the heat caused by this power dissipation must be conveyed from the circuit. Transformers are typically the largest and heaviest, and most costly, component of a switching power supply.

In a typical "chopper" switching power supply an input AC voltage is applied to a transformer and is stepped down to a lower AC output voltage. The AC output voltage is rectified and filtered to provide a DC voltage which may then be converted to a high frequency square wave via semiconductor switches and a controller circuit. The duty cycle of this square wave signal is controlled to provide a measured output DC power level, and power feedback is utilized to regulate the controller. The final DC voltage is formed from the square wave voltage signal by rectifiers and/or filters.

Another typical prior art power supply is an inverter switching power supply, wherein an input AC line voltage is rectified and filtered to form a DC voltage, and the DC voltage is then converted to a high frequency square wave which is coupled to a high frequency transformer. The transformer output signals are then rectified and filtered to provide a regulated DC output voltage, and a form of voltage or current feedback is used to control the output. The transformer utilized in an inverter switching power supply is typically of smaller size and lower power capability than a transformer in a chopper power supply, but the transformer is still a relatively large and costly component in the power supply circuit, and has a low efficiency.

There is an advantage in providing a DC power supply wherein voltage isolation may be maintained between an AC power source input and a regulated DC output voltage. There is a further advantage in utilizing some form of feedback to control and regulate DC output voltage or current, and it would be useful to provide a power supply having these characteristics without requiring the use of a transformer.

SUMMARY OF THE INVENTION

The present invention includes a rectifier for converting an AC input voltage into a DC voltage, and a storage capacitor for storing the energy of the DC voltage. The storage capacitor may be isolated from the DC input voltage by a pair of switching blocks, and also may be isolated from the load by a second pair of switching blocks. The respective pairs of switching blocks are controlled by timed voltage signals so as to alternately connect the storage capacitor to the input DC voltage, and then to the output DC load. A dead time exists between the respective switching signals for turning on the respective pairs of switching blocks, so that it is never possible for both pairs of switching blocks to turn on simultaneously; further, the turn-on time interval of either pair of voltage switching blocks may be controlled by means of a feedback signal or a manual adjustment, so as to provide a controlled and regulated voltage or current to the load.

It is a principal object of the present invention to provide a switching power supply having voltage isolation between the input power and the output load.

It is another object of the present invention to provide a switching power supply having a manually adjustable output voltage or current.

It is a further object of the present invention to provide a switching power supply having voltage feedback control so as to regulate the output DC voltage or current.

The foregoing and other objects, and advantages of the invention, will become apparent from the following specification and claims, and with reference to the appended drawings.

DESCRIPTION OF THE PREFERRED EMBODIMENT

Figure 1:
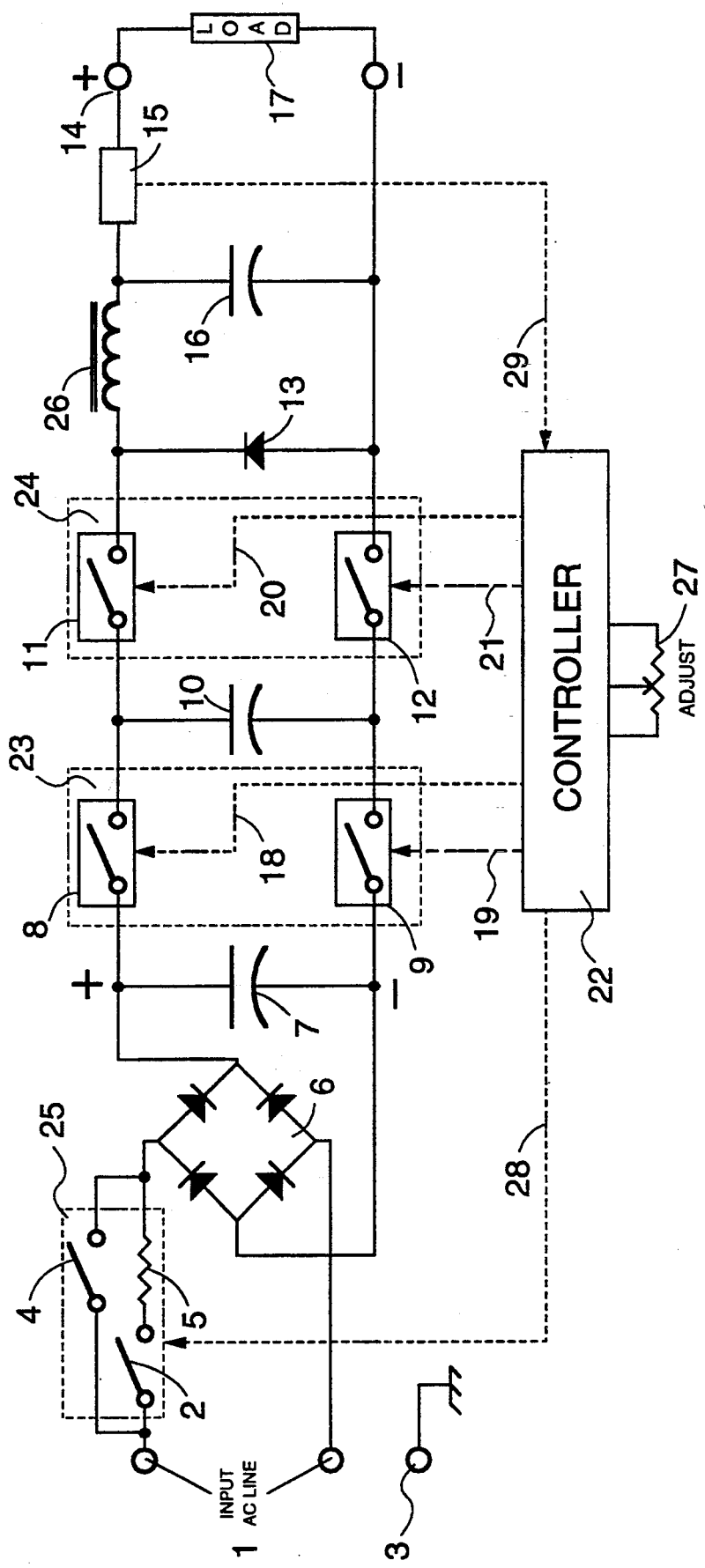
FIG. 1 shows a schematic diagram of the invention.

Referring to the drawings, an input AC line voltage is applied to terminal 1 of the switching power supply, and an earth ground or the like is provided to a terminal 3 of the switching power supply. The input AC line voltage may be applied to a full-wave rectifier 6 via a power switching module 25. Power switching module 25 includes a "soft" power switch 2 in series with a line resistance 5, to provide an initial reduced AC current to bridge rectifier 6 and capacitor 7, and a "hard" power switch 4 to provide the full input AC line voltage to the rectifier bridge. Switches 2 and 4 are typically turned on in time sequence so as to delay the full application of the AC input line voltage to the switching power supply over a finite time period. The timing control for power switching module 25 may be provided by a controller 22, via a signal line 28, which may first turn on power switch 2 and subsequently turn on power switch 4.

The rectified output voltage from bridge circuit 6 is applied to a storage capacitor 7, which quickly charges to a predetermined rectified DC voltage level. For example, with an input AC line voltage of 230 volts AC, the DC voltage level of charge for capacitor 7 may be 325 volts DC.

The voltage applied to capacitor 7 is coupled to switches 8 and 9 within switching block 23, wherein each of the switches 8 and 9 are respectively controlled by a voltage signal on lines 18 and 19. Switches 8 and 9, and the other switches shown in the diagram of FIG. 1, are preferably semiconductor switches of a type well known in the art, and the switches may be selected from a number of widely available semiconductor switches, depending upon the particular power requirements for the switching power supply. The output of switching block 23 is connected across a second storage capacitor 10, and is also connected to a second switching block 24. The second switching block 24 comprises two switches 11 and 12, each of which is respectively controlled by signals on lines 20 and 21. The output from the second switching block 24 is coupled to a circuit consisting of a freewheeling diode 13, and inductor choke 26, and a storage capacitor 16. The voltage applied to storage capacitor 16 is in turn connected to a load 17 via a current or voltage sensing circuit 15. The current or voltage sensing circuit 15 provides a signal representative of the sensed value via line 29 which is a feedback signal to controller 22.

Controller 22 has a manually adjustable potentiometer 27 which serves as a means for presetting a desired output voltage to the load 17. Controller 22 also delivers timing signals via lines 18-21 to the respective switches 8, 9, 11 and 12, and also delivers a timing signal to the power module 25 via line 28. Controller 22 receives a voltage/current feedback signal via line 29.

Figure 2:
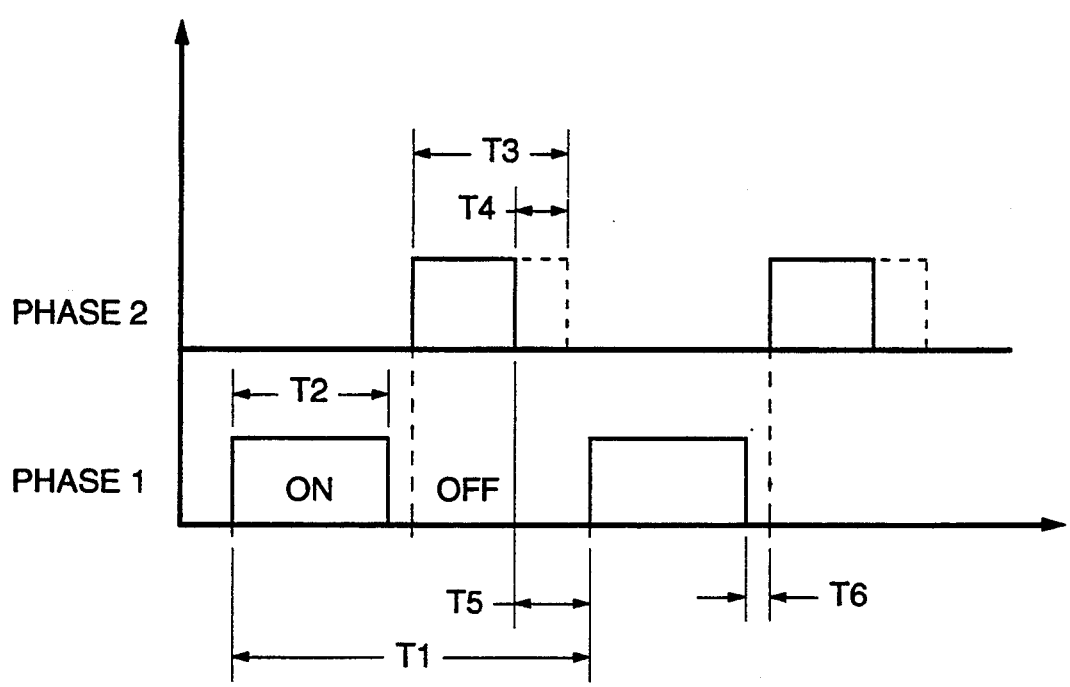
FIG. 2 shows a timing diagram illustrating the operation of the switching control circuits.

FIG. 2 shows the timing signals developed by controller 22 for delivery over signal lines 18-21. The signals identified as "phase 1" are applied to lines 18 and 19 simultaneously, and comprise a regular pattern of "on" and "off" signals delivered at a regular frequency, as for example, 40,000 cycles per second. This signal must have a high on/off rate to enable the use of a small charge capacitor. Also, the higher frequency provides smaller fluctuations in the capacitor voltage, between its charged and discharged states. The wavelength of this frequency is T1, and the "on" signal is delivered for a predetermined time T2. The "off" signals are delivered for a relatively greater time duration than the "on signals," as described hereinafter.

The signals identified as "phase 2 signals" are applied uniformly to lines 20 and 21 by controller 22. The "phase 2" signals are also a repetitive series of "on" and "off" signals, but the respective "on" and "off" times are selectively controlled by controller 22. The time duration permitted for an "on" signal is variable, up to a maximum time interval of T3, wherein time T3 is never permitted to start before a predetermined time delay T6, relative to the last phase 1 "on" signal. The time T3 is also regulated to always permit a second time delay T5 from the end of the T3 signal to the next subsequent "on" phase 1 signal. Therefore, it is never possible for a phase 1 signal and a phase 2 signal to be "on" simultaneously, for there is always a delay time T5 and T6 between respective phase 1 and phase 2 signals. The time T4 is the variation between the maximum "on" time T3 for a phase 2 signal, and the minimum "on" time which is permitted by controller 22.

In operation, the "adjust" potentiometer 27 of controller 22 is manually adjusted to some value. The phase 1 drive signals cause switches 8 and 9 to turn on for a time period T2, thereby resulting in a predetermined voltage charge on capacitor 10. Switches 8 and 9 then turn off and a predetermined time T6 later, switches 11 and 12 turn on for a time (T3-T4). After this time, switches 11 and 12 turn off, and a time T5 later, switches 8 and 9 again turn on. Switches 8 and 9 turn on for a second time T2, and then turn off. After a predetermined delay T6, switches 11 and 12 again turn on for a predetermined time (T3-T4). During the time the phase 2 signals are on the voltage stored in capacitor 10 is coupled into the choke 26, output capacitor 16 and load 17. At the end of the phase 2 timing signal, switches 11 and 12 are turned off, but the residual energy stored in capacitor 16 and/or choke 26 provides a continuing output voltage through the load and through the freewheeling diode 13. While this is occurring, capacitor 10 is being recharged by the input DC voltage passing through switches 8 and 9.

The feedback circuit 15 may be designed to sense either the output load voltage or the output load current, and it returns a signal representative of its sensed value back to the controller 22. The controller 22 compares the signal received from feedback circuit 15 to the signal set by the "adjust" potentiometer 27, and makes the necessary timing adjustments to the phase 2 signals so as to increase or decrease the turn-on time of switches 11 and 12 in accordance with the feedback signal. If the feedback signal from circuit 15 represents a lower value than the "adjust" potentiometer signal 27, the phase 2 "on" times will be increased toward the maximum time T3, thereby turning on transistors 11 and 12 for a longer time interval, and permitting a larger voltage charge to be stored in capacitor 16 and choke 26. If the feedback signals from circuit 15 are less than the "adjust" potentiometer 27 signal, the phase 2 timing signals will be reduced in time so as to provide a lower charging time interval for capacitor 16 and choke 26. In this manner, the voltage/current feedback signal is utilized to control the phase 2 timing signal so as to develop and output load voltage/current which is consistent with the value preset in the "adjust" potentiometer 27.

An alternative embodiment of the invention may be constructed, wherein the alternative embodiment provides some of the advantages of the invention but does not provide the requisite voltage isolation. The alternative embodiment might be useful in certain specific applications. Referring to FIG. 1, the switches 9 and 12 may be removed from the ground return line, and a solid connection may be substituted therefor. This alternative will still permit capacitor 10 to be charged by switch 8, and will permit the storage retained in capacitor 10 to be dumped into the load via switch 11, but the existence of a solid ground return line from the load back to the input DC voltage source will not permit the complete voltage isolation which is possible with the primary embodiment.

A further embodiment of the invention is also possible, wherein the phase 1 timing signals are controlled so as to provide variable "on" times to switching block 23. This embodiment may have some use in specific applications, but experimentation has shown that regulating the phase 2 time intervals produces a wholly satisfactory and preferred result.

The preselected choice of phase 1 and phase 2 signals permits a variable step-down voltage to be delivered to the load from any predetermined DC input voltage level. The voltage ultimately applied to the load as a function of the initial DC voltage charge placed on capacitor 7, the percentage of that voltage charge which is subsequently dumped into capacitor 10 by switching block 23, and the percentage of that voltage charge which is subsequently dumped into capacitor 16 by switching bank 24. By controlling the relative switching times of switching banks 23 and 24 it is possible to control the ultimate voltage and/or current delivered to the load, and thereby to effectively provide a step-down function for delivering input voltage energy to the load.

The present invention provides a regulating switching voltage or current supply which usefully operates without transformer coupling, and yet provides full voltage isolation. By using high-efficiency, high-speed switching devices such as metal oxide silicon field effect transistors (MOSFET) and insulated gate bi-polar transistors (IGBT) in the switching blocks 23 and 24, it is possible to increase the overall efficiency of the power supply by a factor approaching 100%. The frequency of the phase 1 and phase 2 timing signals may be preselected over a wide range of design choices, and at higher frequencies the size of the choke and the capacitors are reduced. The respective delay times T5 and T6 may be preselected according to the switching characteristics of the semiconductors chosen for the power supply, so as to provide a predefined and definite period of time when both the phase 1 and the phase 2 timing signals are off.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A transformerless power supply for transforming alternating current (AC) power to a direct current (DC) load while maintaining voltage isolation between an AC power source and a DC load, comprising:
   a) a rectifier circuit connected to said AC power source and having a rectified DC voltage output terminal;
   b) a first capacitor connected to said DC voltage output terminal;
   c) a first switching block connected across said first capacitor, said first switching block having a switchable output and a control terminal for activating said switchable output;
   d) a second capacitor connected to said first switching block switchable output;
   e) a second switching block connected across said second capacitor, said second switching block having a switchable output and a control terminal for activating said switchable output;
   f) an electrical load connected to said second switching block switchable output; and
   g) a control circuit having means for generating respective sequential timed "on" and "off" control signals for first and second output lines, said first output line connected to said first switching block control terminal and said second output line connected to said second switching block control terminal; said control circuit further having means for generating said respective timed "on" control signals to either of said first and second output lines only during a time interval when the other of said first and second output lines is receiving a respective "off" timed control signal; said control circuit further comprising means for manually adjusting relative time intervals of said respective timed control signals.

2. The apparatus of claim 1, wherein said control circuit further comprises a feedback circuit means for adjusting the relative time intervals of said respective times control signals; and further comprising a feedback sensor coupled to said load and connected to said feedback circuit.

3. The apparatus of claim 2, further comprising an inductive choke connected between said load and second switching block switchable output, and a capacitor connected in parallel with said load, and a diode connected in parallel with the series combination of said choke and said load.

4. The apparatus of claim 1, wherein said first switching block and said second switching block each further comprise a pair of semiconductor switching circuits, a first one of said switching circuits interposed in a voltage delivery line, and a second one of said switching circuits interposed in a voltage ground return line.

5. The apparatus of claim 4, wherein said voltage delivery line further comprises a direct current voltage delivery line.

6. The apparatus of claim 5, wherein said capacitor is further connected between said voltage delivery line and said voltage ground return line.

7. The apparatus of claim 4, further comprising an inductive choke connected in series with said first switching circuit in said second switching block and said load.

8. The apparatus of claim 7, further comprising a third capacitor connected in parallel with said load.

9. The apparatus of claim 8, further comprising a diode connected in parallel with the series combination of said choke and said load.

10. A transformerless switching power supply for converting an alternating current supply voltage to a regulated direct current load voltage, comprising:
   a) a rectifier for converting said alternating current supply voltage to a first direct current voltage; and a first storage capacitor connected to said rectifier for storing said first direct current voltage;
   b) a first switching circuit connected to receive said first direct current voltage, and having a first control input for selectively turning said first switching circuit on and off, and having an output;
   c) a second storage capacitor connected to the output of said first switching circuit;
   d) a second switching circuit connected to said second storage capacitor, and having a second control input for selectively turning said second switching circuit on and off, and having an output;
   e) a load connected to the output of said second switching circuit;
   f) a controller circuit having means for generating non-coincident first and second timing signals, said first timing signals being connected to said first control input to turn said first switching circuit on only during a time interval when said second switching circuit is turned off, and said second timing signals being connected to said second control input to turn said second switching circuit on only during a time interval when said first switching circuit is turned off; and
   g) feedback means coupled to said load and connected to said controller circuit, and wherein said controller circuit further comprises means for manually presetting desired load power characteristics, and means for receiving signals from said feedback means and adjusting said second timing signals to deliver said desired load power characteristics to said load in response to said signals received from said feedback means.

11. The apparatus of claim 10, further comprising electrical energy storage means coupled between said second switching circuit output and said load, for delivering electrical energy to said load when said second switching circuit is turned off.

12. The apparatus of claim 11, wherein said electrical energy storage means further comprises an inductive choke, storage capacitor and diode connected in series, wherein said load is connected in parallel with said storage capacitor.

* * * * *